(12) United States Patent
Bennett et al.

(10) Patent No.: US 9,978,208 B2
(45) Date of Patent: May 22, 2018

(54) GAMING SYSTEM AND A METHOD OF GAMING BASED ON HIT-RATE

(71) Applicant: Aristocrat Technologies Australia Pty Limited, North Ryde, NSW (AU)

(72) Inventors: Nicholas Luke Bennett, Manly Vale (AU); Philippa Alice Graham, Clovely (AU)

(73) Assignee: Aristocrat Technologies Australia Pty Limited (AU)

( * ) Notice: Subject to any disclaimer, the term of this patent is extended or adjusted under 35 U.S.C. 154(b) by 24 days.

(21) Appl. No.: 15/180,969

(22) Filed: Jun. 13, 2016

(65) Prior Publication Data

US 2016/0292962 A1 Oct. 6, 2016

Related U.S. Application Data

(63) Continuation of application No. 13/850,939, filed on Mar. 26, 2013, now Pat. No. 9,364,753, which is a continuation of application No. 12/331,033, filed on Dec. 9, 2008, now Pat. No. 8,425,302.

(30) Foreign Application Priority Data

Dec. 14, 2007 (AU) ................................ 2007906824
Mar. 27, 2008 (AU) ................................ 2008901459

(51) Int. Cl.
*G07F 17/32* (2006.01)
*A63F 13/30* (2014.01)

(52) U.S. Cl.
CPC .......... *G07F 17/3239* (2013.01); *A63F 13/12* (2013.01); *G07F 17/3276* (2013.01); *G07F 17/3283* (2013.01)

(58) Field of Classification Search
CPC ............. G07F 17/3239; G07F 17/3283; G07F 17/3276; A63F 13/12
See application file for complete search history.

(56) References Cited

U.S. PATENT DOCUMENTS

| 6,461,240 | B1 | 10/2002 | Perkins |
| 6,656,047 | B1 | 12/2003 | Tarantino et al. |
| 8,425,302 | B2* | 4/2013 | Bennett .............. G07F 17/3276 463/20 |
| 9,364,753 | B2* | 6/2016 | Bennett .............. G07F 17/3276 |
| 2001/0034264 | A1 | 10/2001 | Berman et al. |
| 2003/0109306 | A1 | 6/2003 | Karmarkar |
| 2003/0114218 | A1 | 6/2003 | McClintic |
| 2004/0135317 | A1 | 7/2004 | Stern |

(Continued)

FOREIGN PATENT DOCUMENTS

| CA | 2403035 | 3/2003 |
| GB | 2387950 | 10/2003 |

(Continued)

*Primary Examiner* — John P Dulka
(74) *Attorney, Agent, or Firm* — McAndrews, Held & Malloy, Ltd.

(57) ABSTRACT

A method of triggering a multi-player game, comprising: determining a current number of eligible gaming machines; communicating current hit rate data based on the current number of eligible gaming machines to at least each eligible gaming machine; determining at each eligible gaming machine whether to trigger the multi-player game at a hit rate based on the current hit rate data.

20 Claims, 8 Drawing Sheets

(56) References Cited

U.S. PATENT DOCUMENTS

| | | |
|---|---|---|
| 2005/0148382 A1 | 7/2005 | Fox |
| 2006/0082056 A1 | 4/2006 | Kane et al. |
| 2006/0119044 A1 | 6/2006 | Kekempanos et al. |
| 2006/0197283 A1 | 9/2006 | Thinnes |
| 2006/0247955 A1 | 11/2006 | Humphrey |

FOREIGN PATENT DOCUMENTS

| | | |
|---|---|---|
| JP | 2002306796 | 10/2002 |
| JP | 2003062167 | 3/2003 |
| JP | 2003102918 | 4/2003 |
| JP | 2003126463 | 5/2003 |
| JP | 2004033330 | 2/2004 |
| JP | 2004236873 | 8/2004 |
| JP | 2006231073 | 9/2006 |
| JP | 2006331031 | 12/2006 |
| JP | 2006341001 | 12/2006 |
| WO | 0064545 | 11/2000 |
| WO | 0136059 | 5/2001 |
| WO | 2006015442 | 2/2006 |
| WO | 2006080224 | 8/2006 |
| WO | 2007044785 | 4/2007 |

* cited by examiner

Figure 9

GAMING SYSTEM AND A METHOD OF GAMING BASED ON HIT-RATE

RELATED APPLICATIONS

This application is a continuation of U.S. patent application Ser. No. 13/850,939, having a filing date of Mar. 26, 2013, which is a continuation of U.S. patent application Ser. No. 12/331,033, having a filing date of Dec. 9, 2008, now U.S. Pat. No. 8,425,302, which claims priority to Australian Provisional Patent Application No. 2007906824, having a filing date of Dec. 14, 2007 and Australian Provisional Patent Application No. 2008901459 filed Mar. 27, 2008. The above-identified applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to a gaming system and a method of gaming

BACKGROUND OF THE INVENTION

Currently most electronic gaming machines deployed to the market are standalone gaming machines, in the sense that game play is carried out by electronics located within the gaming machine cabinet such that a player plays a game by operating that gaming machine and the player's play is independent of other players playing other gaming machines.

Some venues conduct tournament games where players play the same game on a plurality of neighbouring gaming machines for a period of time; the winner being judged, for example, as the player who accumulates the most credits in the time period.

Other tournament games have been proposed where players participate in a common game displayed on a common display. For example, where players take turns to make selections of objects to try to reveal a prize.

There is a need for other multi-player games.

BRIEF SUMMARY OF THE INVENTION

In a first aspect, the invention provides a method of triggering a multi-player game, comprising:
  determining a current number of eligible gaming machines;
  communicating current hit rate data based on the current number of eligible gaming machines to at least each eligible gaming machine;
  determining at each eligible gaming machine whether to trigger the multi-player game at a hit rate based on the current hit rate data.

In an embodiment, eligible gaming machines are active gaming machines of a set of gaming machines.

In an embodiment, the current hit rate data includes the number of eligible gaming machines and each gaming machine determines the hit rate from the number.

In an embodiment, the current hit rate data is the current hit rate.

In an embodiment, each eligible gaming machine determines whether to trigger the multi-player game as part of each game round.

In a second aspect the invention provides a gaming system comprising a plurality of gaming machines, the gaming system arranged to conduct a multi-player game to be played by two or more players, the gaming system arranged to trigger the multi-player game by:
  determining a current number of eligible gaming machines;
  communicating current hit rate data based on the current number of eligible gaming machines to at least each eligible gaming machine;
  determining at each eligible gaming machine whether to trigger the multi-player game at a hit rate based on the current hit rate data.

In an embodiment, the gaming system comprises a feature controller arranged to determine the number of eligible gaming machines and communicate the hit rate data.

In an embodiment, the feature controller is provided by one of the gaming machines.

In an embodiment, the feature controller is separate to the gaming machines.

In an embodiment, eligible gaming machines are active gaming machines of a set of gaming machines.

In an embodiment, the current hit rate data includes the number of eligible gaming machines and each gaming machine determines the hit rate from the number.

In an embodiment, the current hit rate data is the current hit rate.

In an embodiment, each eligible gaming machine determines whether to trigger the multi-player game as part of each game round.

In a third aspect, the invention provides a method of gaming comprising:
  starting a multi-player game to be played by two or more players;
  conducting game rounds for each of the players until an end condition is met, each game round comprising, for each player:
    (a) selecting a plurality of symbols for display at a plurality of display positions on a display associated with the player, and
    (b) updating a player progress record from the displayed symbols of designated symbols;
  determining at least one winning player when the end condition is met from each player's progress record; and
  making an award to each winning player.

In an embodiment, the end condition is that at least one player achieves an outcome.

In an embodiment, the outcome is that a designated number of designated symbols is reached by at least one of the players and wherein each player progress record stores a current number of designated symbols and in each game round, the player progress record is updated by determining a number of designated symbols for the round from the displayed symbols.

In an embodiment, the method comprises, for each game round, visually representing each player's record by filling individual ones of a plurality of progress display positions corresponding to the designated total with the number of designated symbols determined for the game round.

In an embodiment, the award is dependent at least partly on the time taken to achieve the outcome.

In an embodiment, the end condition is that a designated number of game rounds is completed.

In an embodiment, the award is based at least partly on the player's position based on the player progress record.

In an embodiment, the award is based at least partly on a level achieved by the player by the completion of the designated number of game rounds.

In an embodiment, the display positions correspond to visible symbols of respective ones of a plurality of stopped reels and symbols selected for display for each reel.

In an embodiment, each reel has a reel sequence and the symbols for each reel are selected by selecting a stop position for each reel sequence.

In an embodiment, the game is started as a feature game in response to a trigger event, and the players play independently prior to the trigger event.

In an embodiment, the trigger event is determined by determining a current number of eligible gaming machines;
communicating current hit rate data based on the current number of eligible gaming machines to at least each eligible gaming machine;
determining at each eligible gaming machine whether to trigger the multi-player game at a hit rate based on the current hit rate data.

In an embodiment, eligible gaming machines are active gaming machines of a set of gaming machines.

In an embodiment, the current hit rate data includes the number of eligible gaming machines and each gaming machine determines the hit rate from the number.

In an embodiment, the current hit rate data is the current hit rate.

In an embodiment, each eligible gaming machine determines whether to trigger the multi-player game as part of each game round.

In an embodiment, the set of symbols from which symbols are selected are specific to the feature game.

In an embodiment, the symbols are comprised of the designated symbol and blank symbols.

In an embodiment, the method comprises controlling the game rounds with a tournament controller to ensure no player has an unintended advantage based on the number of game rounds played by each player.

In an embodiment, each player plays a base game on the gaming machine and the trigger event occurs on the gaming machine of one of the players.

In a fourth aspect, the invention provides a gaming system comprising a plurality of gaming machines, each of the gaming machines comprising a display, the gaming system arranged to conduct a multi-player game to be played by two or more players, the gaming system arranged to:
start a multi-player game to be played by two or more players;
conduct game rounds for each of the players until an end condition is met, each game round comprising, for each player:
(a) selecting a plurality of symbols for display at a plurality of display positions on a display associated with the player, and
(b) updating a player progress record from the displayed symbols of designated symbols;
determine at least one winning player when the end condition is met from each player's progress record; and
make an award to each winning player.

In an embodiment, the gaming system is arranged to conduct the game as a feature game in response to a trigger event occurring in relation to play of a game on one of the gaming machine.

In an embodiment, the gaming system comprises a feature controller arranged to control the gaming machines to conduct the feature game in response to the trigger event occurring.

In an embodiment, the feature controller is arranged to control the play of game rounds on the plurality of gaming machines such that no player has an unintended advantage based on the number of game rounds played by each player.

In an embodiment, the gaming machines are in data communication with one another, and the feature controller is implemented by a server module of one of the gaming machines.

In an embodiment, the symbols are selected for each gaming machine by a client module of each gaming machine.

In an embodiment, the client modules communicate data to the server module after each game round and the server module is arranged to determine either that there is a winning player based on the data or to instruct the client modules to conduct at least one further game round.

In an embodiment, the end condition is that at least one player achieves an outcome.

In an embodiment, the outcome is that a designated number of designated symbols is reached by at least one of the players and wherein each player progress record stores a current number of designated symbols and in each game round, the player progress record is updated by determining a number of designated symbols for the round from the displayed symbols.

In an embodiment, the gaming system is arranged, for each game round, such that each gaming machine visually represents each player's record by filling individual ones of a plurality of progress display positions corresponding to the designated total with the number of designated symbols determined for the game round.

In an embodiment, the award is dependent at least partly on the time taken to achieve the outcome.

In an embodiment, the end condition is that a designated number of game rounds is completed.

In an embodiment, the award is based at least partly on the player's position based on the player progress record.

In an embodiment, the award is based at least partly on a level achieved by the player by the completion of the designated number of game rounds.

In an embodiment, the display positions correspond to visible symbols of respective ones of a plurality of stopped reels and symbols selected for display for each reel.

In an embodiment, each reel has a reel sequence and the symbols for each reel are selected by selecting a stop position for each reel sequence.

In an embodiment, the trigger event is determined by determining a current number of eligible gaming machines;
communicating current hit rate data based on the current number of eligible gaming machines to at least each eligible gaming machine;
determining at each eligible gaming machine whether to trigger the multi-player game at a hit rate based on the current hit rate data.

In an embodiment, eligible gaming machines are active gaming machines of a set of gaming machines.

In an embodiment, the current hit rate data includes the number of eligible gaming machines and each gaming machine determines the hit rate from the number.

In an embodiment, the current hit rate data is the current hit rate.

In an embodiment, each eligible gaming machine determines whether to trigger the multi-player game as part of each game round.

In an embodiment, the set of symbols from which symbols are selected are specific to the feature game.

In an embodiment, the symbols are comprised of the designated symbol and blank symbols.

In an embodiment, each player plays a base game on the gaming machine and the trigger event occurs on the gaming machine of one of the players.

It will be appreciated that the above first and third aspects or second and fourth aspects can be combined.

In a fifth aspect, the invention provides computer program code which when executed implements one or both of the above methods.

In a sixth aspect, the invention provides a computer readable medium comprising the above program code.

In a seventh aspect, the invention provides a data signal comprising the above program code.

BRIEF DESCRIPTION OF SEVERAL VIEWS OF THE DRAWINGS

Exemplary embodiments will now be described in relation to the accompanying drawings of which.

DETAILED DESCRIPTION OF THE INVENTION

Referring to the drawings, there is shown a gaming system having a plurality of gaming machines which can be played by players to play a multi-player game implemented as a feature game. In the game, game rounds are conducted for each of the players until a designated number of designated symbols is reached by one or more of the players. Each game round involves selecting a plurality of symbols, determining a number of designated symbols for the round and updating a player record of designated symbols. When one or more players reaches the designated number, at least one winning player is determined and an award is made to each winning player. In an alternative embodiment, the game is conducted for a fixed number of game rounds and awards are made to the leading player at the end of the game rounds.

In the embodiment, each gaming machine is capable of operating in a standalone mode and in a client/server mode wherein one of the gaming machines acts as a server and the other gaming machine acts as a client, and the game is implemented in client/server mode with the server implementing a feature controller that controls the feature game.

Figure 1:
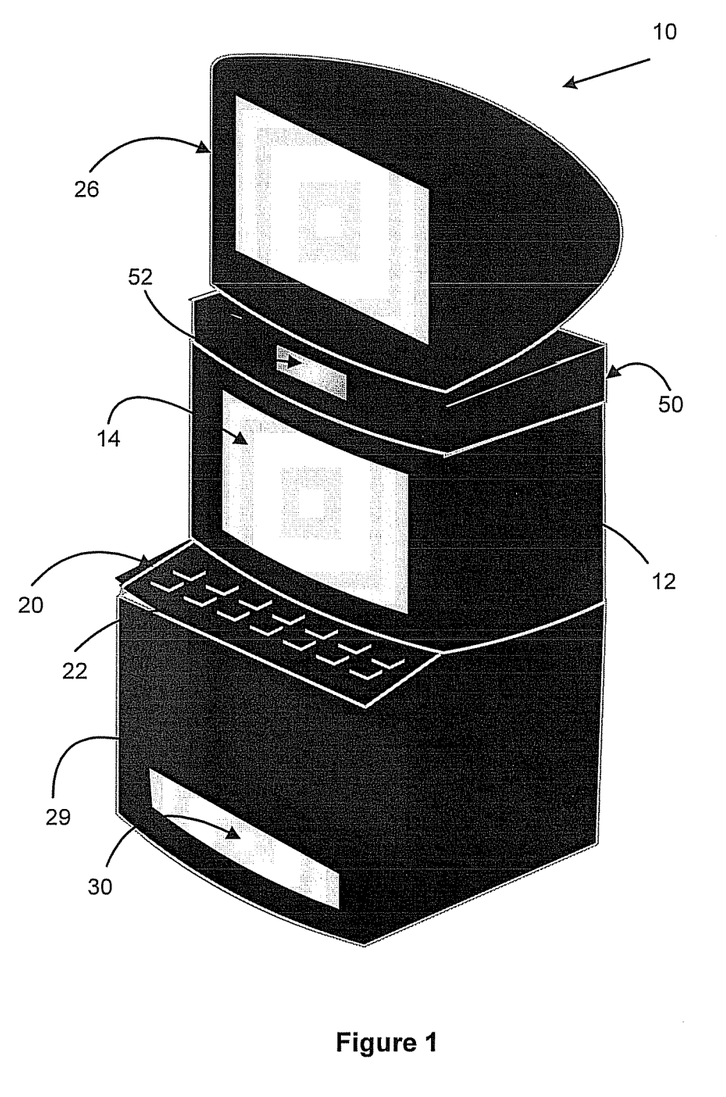
FIG. 1 is a perspective view of a gaming machine of the embodiment.

A stand alone gaming machine 10 is illustrated in FIG. 1. The gaming machine 10 includes a console 12 having a display 14 on which is displayed representations of a game that can be played by a player. A mid-trim 20 of the gaming machine 10 houses a bank of buttons 22 for enabling a player to interact with the gaming machine, in particular during game play. The mid-trim 20 also houses a credit input mechanism for example a coin input chute and/or a bill collector. Other credit input mechanisms may also be employed, for example, a card reader for reading a smart card, debit card or credit card.

Artwork and/or information, for example pay tables and details of bonus awards and other information or images relating to the game may be provided on a front panel 29 of the console 12. A coin tray 30 is mounted beneath the front panel 29 for dispensing cash payouts from the gaming machine 10.

The display 14 shown in FIG. 1 is in the form of a video display unit, particularly a cathode ray tube screen device. Alternatively, the display 14 may be a liquid crystal display, plasma screen, or any other suitable video display unit. The top box 26 also includes a video display which may be of the same type as the display 14, or of a different type.

A player marketing module (PMM) 50 having a display 52 is connected to the gaming machine 10. The main purpose of the PMM 50 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device.

Figure 2:
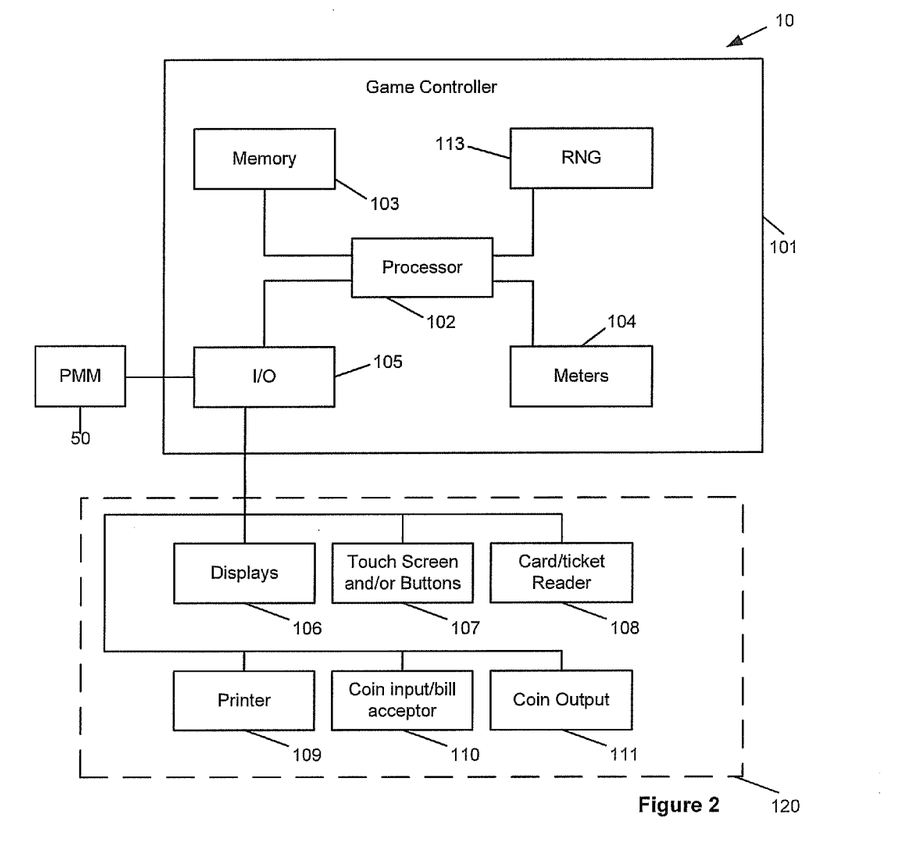
FIG. 2 is a block diagram of the components of a gaming machine of the embodiments.

FIG. 2 shows a block diagram of operative components of a typical gaming machine which may be the same as or different to the gaming machine of FIG. 1.

The gaming machine 100 includes a game controller 101 having a processor 102. Instructions and data to control operation of the processor 102 are stored in a memory 103, which is in data communication with the processor 102. Herein the term "processor" is used to refer generically to any device that can process game play instructions in accordance with game play rules and may include: a microprocessor, microcontroller, programmable logic device or other computational device, a general purpose computer (e.g. a PC) or a server.

Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 2, a player interface 120 includes peripheral devices that communicate with the game controller 101 comprise one or more displays 106, buttons and/or a touch screen 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

Figure 3:
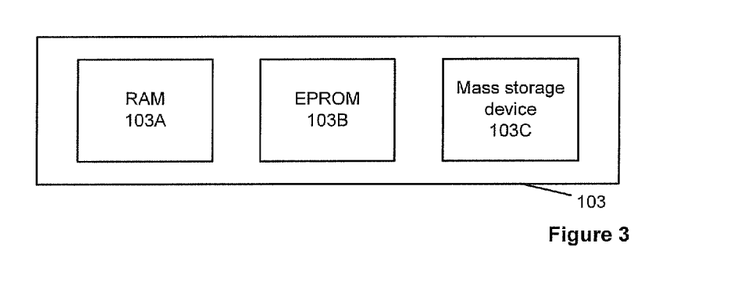
FIG. 3 is a block diagram of the memory of a gaming machine.

FIG. 3 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

Figure 4:
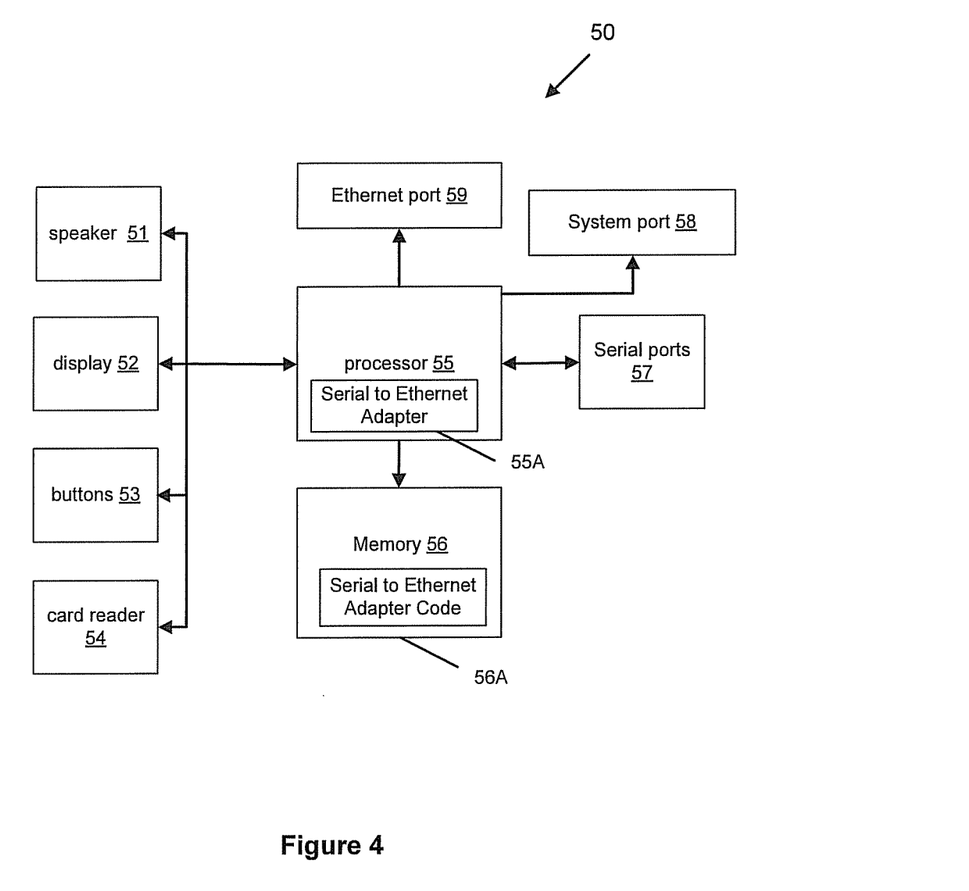
FIG. 4 is a block diagram of a player marketing module of the gaming system of the embodiment.

FIG. 4 is a block diagram of a player marketing module 50. The player marketing module 50 is connected via serial input/output ports 57 to serial input output ports of the input/output section 105 of the electronic gaming machine. The player marketing module has a card reader 54 and a display 52 which may be an LCD touch screen display. The PMM 50 may also have buttons 53 for receiving a player input (at least in embodiments where there is no touch screen display) and a speaker 51. Input received from the card reader 54 is processed by processor 55 based on the data stored in memory 56. The PMM 50 is connected to a System such as Aristocrat's System 7000 by a system port 58. The PMM also has an Ethernet port 59.

In most current gaming machines, such as the Mk VI gaming machine produced by Aristocrat Leisure Industries Pty Ltd, the gaming machine has a number of serial ports and the PMM is connected to a protocol port which is adapted to communicate with a System (such as the System 700 produced by Aristocrat Leisure Industries Pty Ltd) in accordance with a protocol specified for the jurisdiction (e.g. ASP, SAS). The PMM interprets the data received at the serial port 57 and sends it on to the gaming system via system port which is typically another serial port.

In the embodiment, each PMM is also connected via a separate serial port 57 connection to another serial port of the gaming machine. In the case of the Mk VI machine this could be either a spare port or the debug port. The processor executes a Serial to Ethernet Adapter 55A using Serial to Ethernet Adapter code 56A stored in memory 56. The Adapter 55A is arranged to convert all serial communications to Ethernet communication protocols and output them to the Ethernet via Ethernet port 59.

Persons skilled in the art will appreciate that the Serial to Ethernet adapter would not be required for a gaming machine that supported native Ethernet communications (i.e. had it's own Ethernet port). Further, in some embodiments there could be a mixture of machines with and without native Ethernet.

Figure 5:
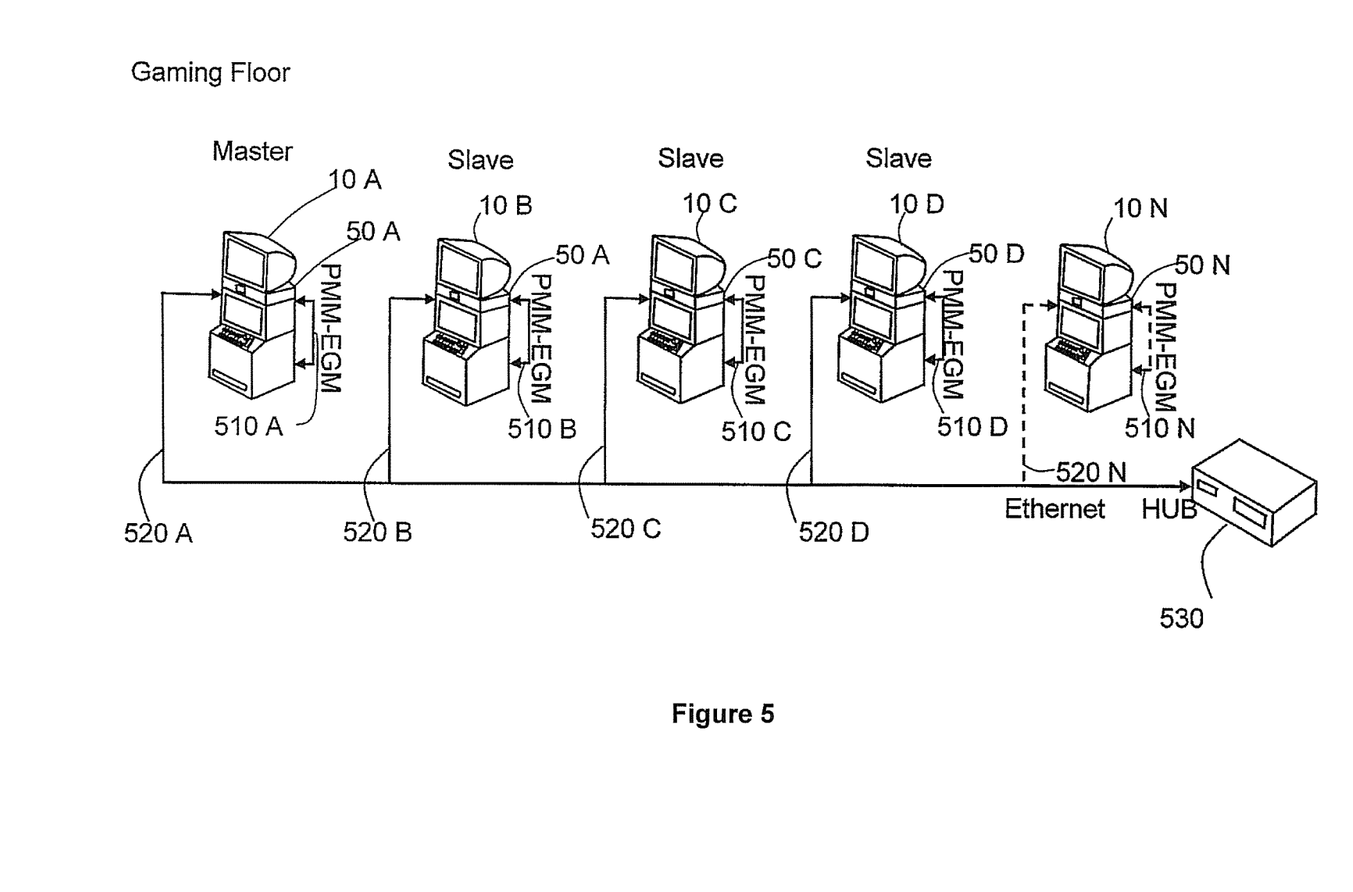
FIG. 5 shows how a plurality of gaming machines may be connected together in a gaming system.

A possible gaming system 500 configuration is shown in FIG. 5 from which it will be seen that a plurality of gaming machines 10 each have a PMM 50 which is connected to the Electronic Gaming Machine via serial connection 510 to the EGM. Each PMM 50 is also connected via Ethernet connection 520 to Ethernet hub 530. The number of gaming machines shown in FIG. 5 is exemplary, for example there may be twenty gaming machines.

It is possible for the gaming machines thus networked to communicate with one another over the Ethernet 520. In the embodiment, Ethernet compatible protocols allow broadcast communications (e.g. to a broadcast address) as well as addressed communications to be made between one of the gaming machines and another of the gaming machines. One of the gaming machines acts as a server 10A in the gaming system 500 illustrated in FIG. 5. In this respect, in the FIG. 5, gaming machine 10A is designated as a Master (i.e. the server) whereas the remaining gaming machines 10B to 10N are designated as Slaves. In the embodiment, the server module 620 implements a feature controller 621.

Figure 6:
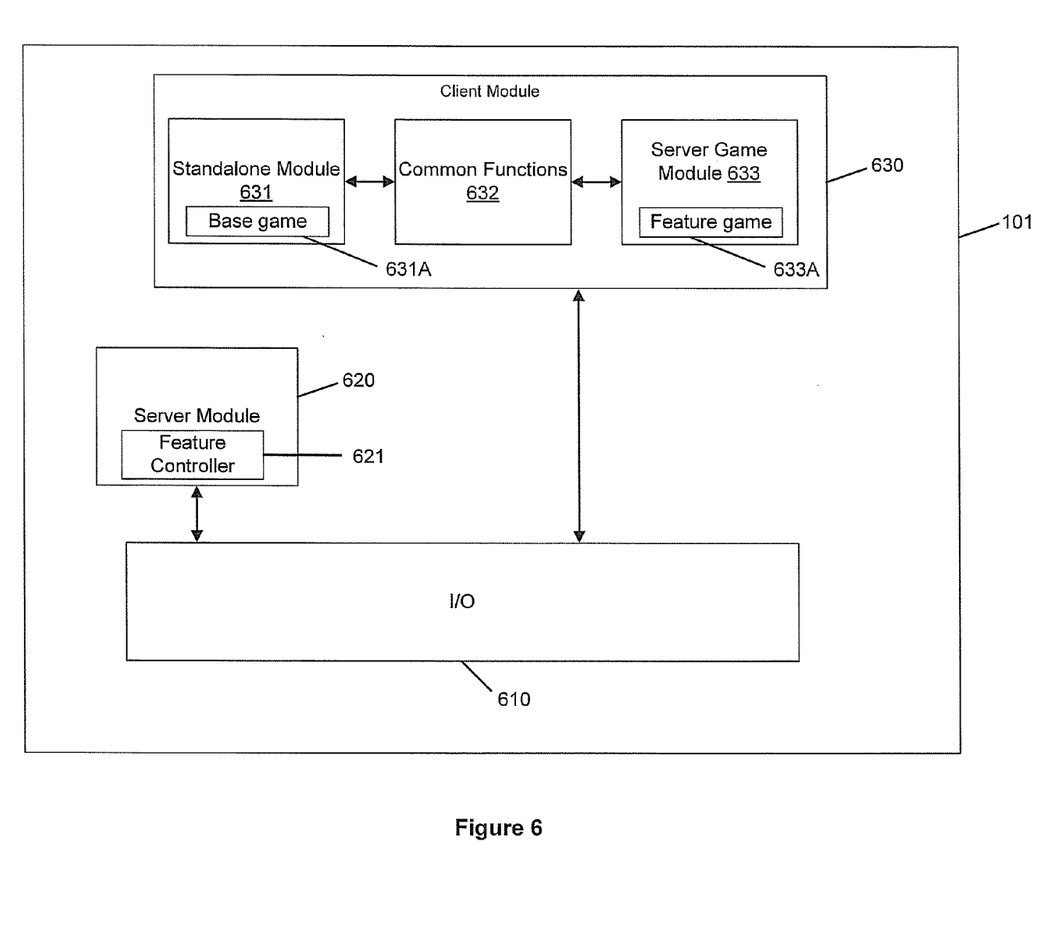
FIG. 6 is a functional block diagram of a gaming machine of the embodiment.

In the embodiment, each of the gaming machines has the same architecture. FIG. 6 shows a functional block diagram of a game controller of the gaming machines. The game controller 101 can be programmed by code loaded into memory 103 to carry out the functions. Persons skilled in the art will appreciate that code can be loaded in a number of ways including by downloading a data signal to the memory over a network or from a computer readable medium or by loading it into part of the memory, e.g. EEPROM 103B before installing the memory. The game controller 101 includes a client module 630 and a server module 620. The server module 620 is adapted to communicate with other game controllers via the input/output ports 610 (as is the client module). The client module includes a standalone module 631 arranged to implement the standalone game, a server game module 633 arranged to receive instructions from a server module by which may be server module 620 or the server module of another gaming machine when the gaming machine is operating in client/server mode and a common function module 632 which includes functions common to both the stand alone module 631 and the server game module 633 for example, processing of input credits or controlling the display. In this embodiment, the standalone game is a base game 631A and the server game is a tournament feature game 633A.

The Serial/Ethernet adapter 55A includes a mater resolution function which determines which of the gaming machines is to be the Master and hence act as the feature controller 621. A start-up procedure also establishes how many machines are connected in the network (the number may vary, for example if a machine is out of service).

Initially, each gaming machine 10 conducts the base game 631A with the standalone module 631. In an embodiment there are 20 game machines. In this embodiment, the base game is known as "Lucky 88" and has fixed 20 number paylines. Players can bet 1, 2, 5, 10 or 25 credits per line, such that there is a fixed minimum bet of 25 credits which include 20 credits for all the base game features and 5 credits for the tournament game. In the embodiment the standalone module 620 monitors for at least one trigger event that can cause the transition from stand alone mode to client/server mode and from play of the base game. This trigger will be output by the client module 630 on which it occurs to the Master 10A via the Ethernet. Therefore, the Master 10A is actively listening for the trigger. In the embodiment, when a tournament feature is triggered, machines will only be eligible to win prizes in the game if a game or a local feature game is currently being played, and any input required by the player has been made within a configured time period (e.g. the last 15 seconds)—this includes making a base game bet, local feature choice or gamble choice.

There is a "time out" meter to indicate that a player should make an input to maintain their eligibility.

It is placed on the top right hand corner of the game screen and decrements (e.g. from 15 to 0 seconds) to indicate to the player that the machine is eligible for the tournament. The last 5 seconds are to be accompanied by a sound effect. Once not eligible for the tournament is the machine flashes "Not in Tournament" accompanied by a sound effect.

Figure 8:
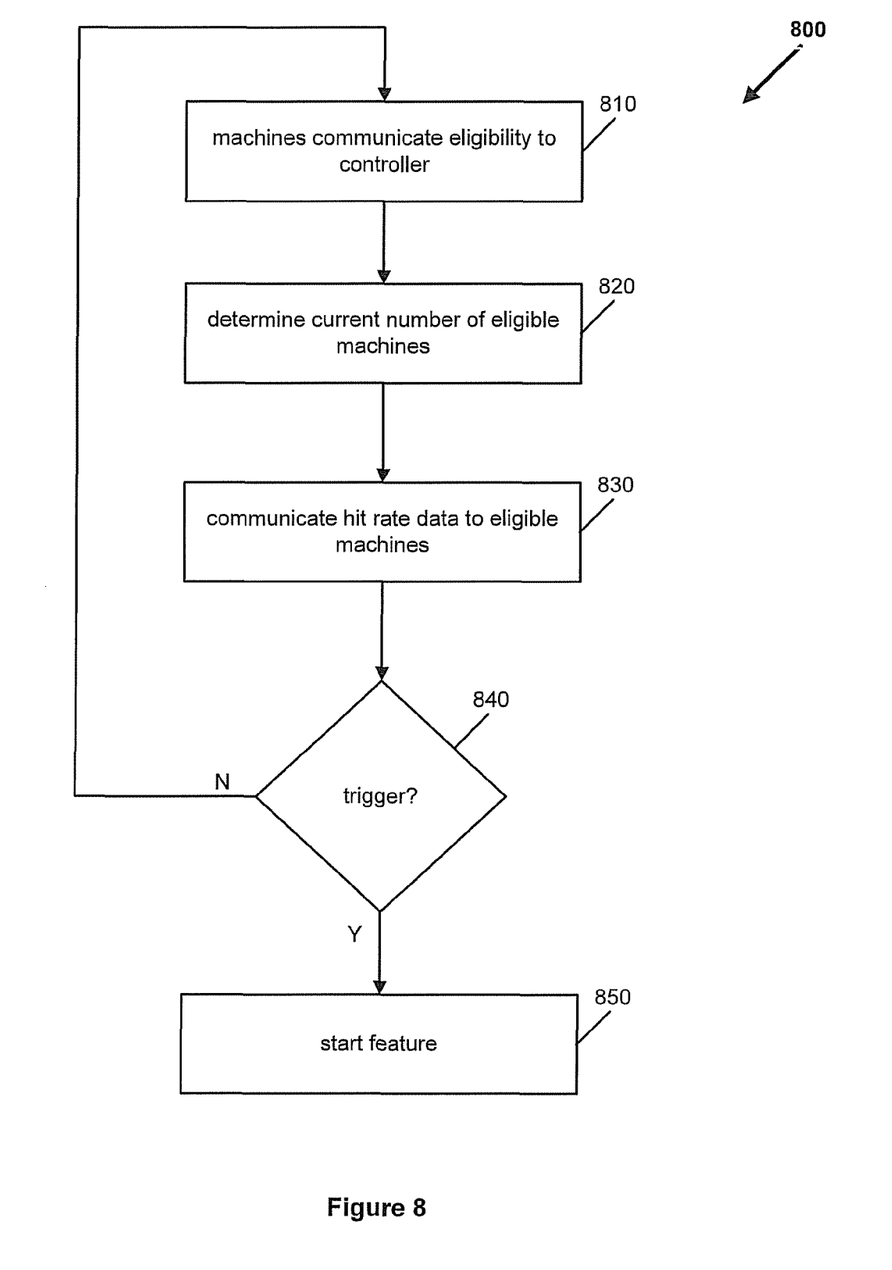
FIG. 8 is a flowchart of a gaming method of the embodiment.

The trigger process 800 is illustrated in FIG. 8. Each gaming machine of the gaming system communicates 810 its eligibility or otherwise to the feature controller of server module 620. The feature controller then determines 820 the total number of eligible machines and the broadcasts 830 to all gaming machines the current total (E) of eligible gaming machines and/or other hit rate data which enables the gaming machines to determine the relevant hit rate and whether to trigger 840. Typically, this is done in a defined reporting cycle such that if the feature controller 621 does not receive an eligibility response from an EGM in a defined period, it marks it as ineligible and updates the total E of eligible machines accordingly. In an alternative embodiment, the total is only communicated to active gaming machines—i.e. those of the gaming machines currently being played by players.

More specifically, whenever a game is initiated at a machine, the following process will occur to check for tournament trigger and eligibility:

1. Determine 820 how many machines are eligible for the tournament based on the received hit rate data (in the above example, the determination involves receiving the number of eligible machines).

2. Determine whether to trigger 840 by selecting a random number between 1 and X, where X varies in accordance with the number of active gaming machines and the number of gaming machines on the bank. X=(N/T)*E where N is a number selected to control the frequency, E is the number of eligible machines and T is the total number of machines on the bank (i.e. that may be eligible).

3. If the selected number is 1 then the gaming machine's client module 620 will:
   a) Notify the feature controller 621 of Master 10A that a tournament feature has been triggered.
   b) Play a base game according to the base bet (the base bet will then apply in the feature game).
   c) Display the tournament banner and disable further play of the base game 631A.
   d) Notify the feature controller 621 that the machine is ready to commence the tournament feature and also the amount that was bet on the game that just completed.

4. Otherwise if the selected number is not 1 (i.e. not a trigger) then:
   a) Play a base game according to the base bet.
   b) Check whether a tournament feature has been triggered by another machine since the start of the game (and keep checking until either another game is initiated or a total of 5 seconds (or other suitable period) has elapsed since the last game completed whichever is the sooner).
   c) If a tournament has been triggered then:
      i) Display the tournament banner and disable further play.
      ii) Notify the feature controller 621 that the machine is ready to commence the tournament feature and also the amount that was bet on the game that just completed.

5. If a feature is triggered by any machine, the feature commences 850.

Accordingly, it will be appreciated that the hit rate data sent to the gaming machines can vary. For example, if the machines know N and T, they can determine X if they are sent E. Alternatively X can be communicated.

If the feature controller 621 receives more than one tournament feature trigger notification before the independent play of the machines 10 is disabled, then the subsequent trigger(s) are buffered along with the bet amounts from each of the machines. As soon as the first feature event completes the next one will initiate before independent game play at the machines resumes.

In this embodiment, machines that are not eligible still participate in the tournament. These machines are still able to receive the multiplier value multiplied by the qualifying bet which is zero—i.e. so that the machines can win but no win amount will be awarded. The prizes which can be awarded to respective machine may be revealed once the tournament is triggered. The prizes for any tournament may be the same or different, for example, a maximum prize for the tournament may be selected.

Figure 9:
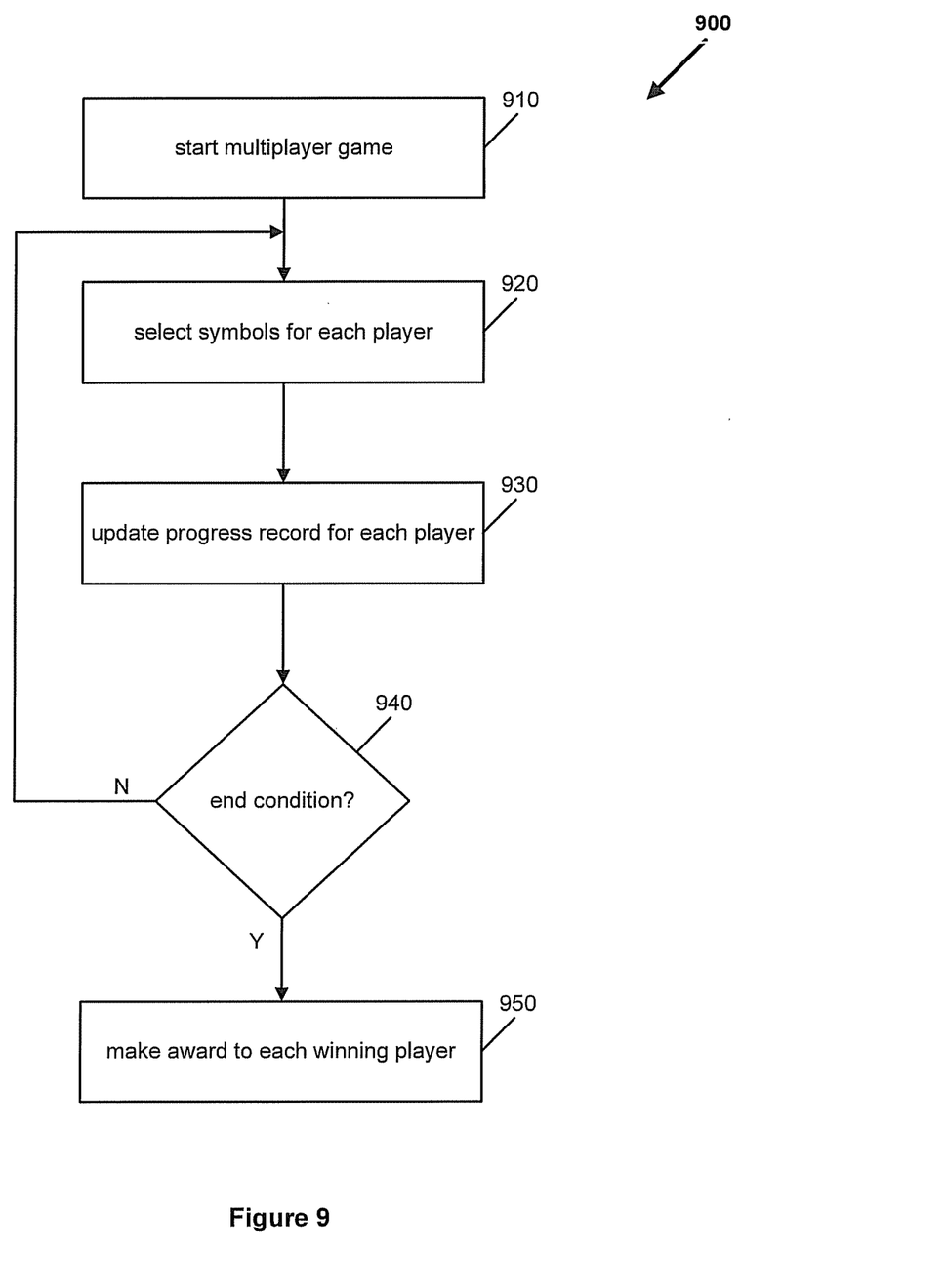
FIG. 9 is a further flowchart of a gaming method of the embodiment.

FIG. 9 illustrates the process 900 of the feature game. Once the feature is to start 910 The feature controller 621 notifies all machines 10 that a tournament feature is about to commence. If a machine is in idle mode or not eligible when it receives this notification then it is still to display a banner over the game screen with the message "TOURNAMENT FEATURE CURRENTLY IN PLAY". Any machine, irrespective of whether it is eligible, can finish 1st, 2nd, 3rd etc.

Once the tournament starts all eligible machines have a banner appear over the reels saying "Lucky 88 Tournament". The game then changes to a set of dedicated reel strips on display 14 under the control of server game module 620. The reels have designated symbols in the form of golden nugget symbols and blank spaces.

Figure 7:
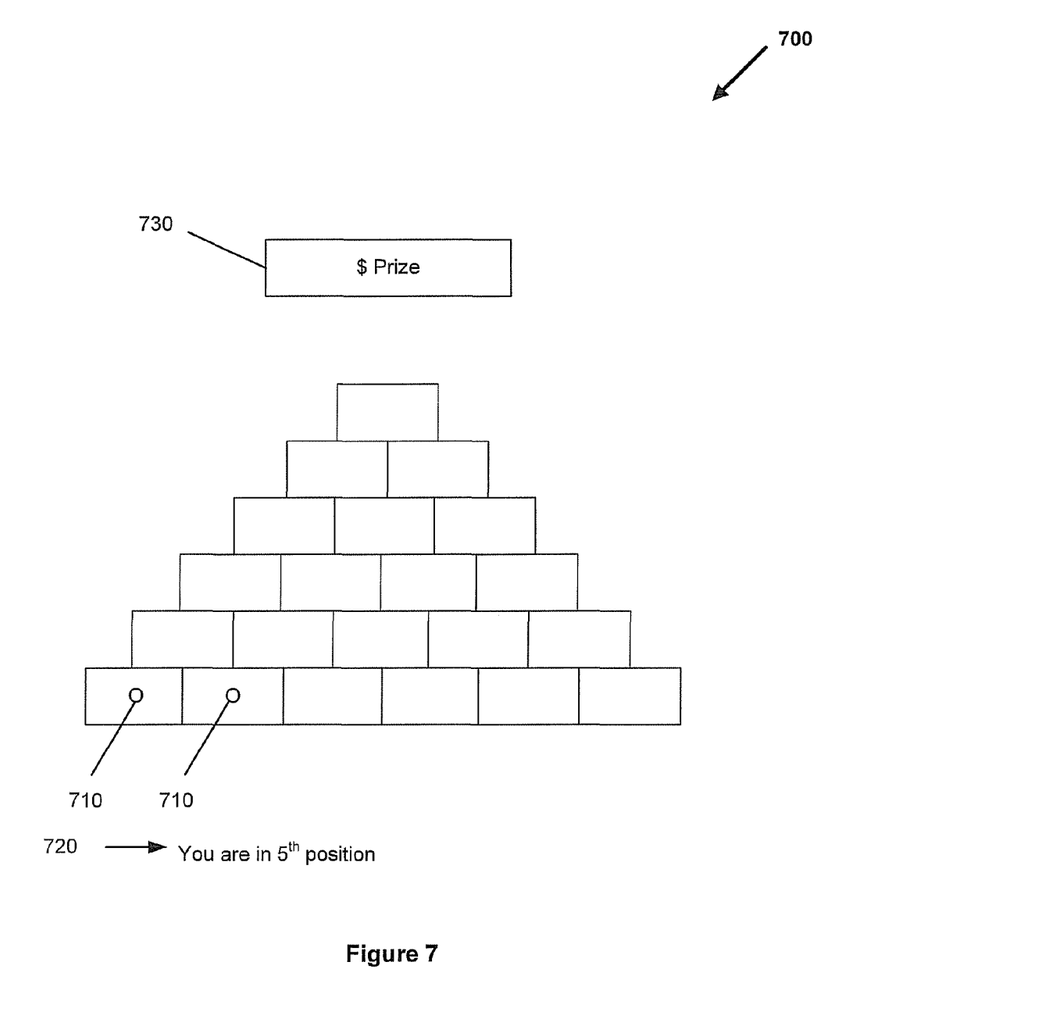
FIG. 7 is an exemplary progress display.

During the tournament the machines 10 are in free play mode—the reels spin under control of server game module 633 without any player input or bet such that in each game round a set of symbols are selected 920 for each gaming machine, namely the display symbols when the reels stop spinning. In this embodiment, the aim of the tournament is to be the first to fill in the Lucky 88 pyramid. As shown in FIG. 7, the Pyramid 700 has 21 segments. These are display positions on the display of top box 26 which may be filled—i.e. there is a designated number of nuggets that the player need to obtain. The designated symbol to be chased is the "Golden Nugget". Each occurrence of a golden nugget in a reel fills segment 710 of the pyramid from bottom to top. The current total of filled segments is a progress record of how many symbols the player has obtained which is updated 930 after each free spin. The machines displays where it is coming—the top screen has a position meter 720 below the pyramid. The prize meter 730 of each machine is to be displayed at the top of the pyramid. This displays what the player may win. The display 730 varies from player to player as it is derived from the bet amount in the base game and five multipliers corresponding to 1st to 5th places in the game—i.e. all five possible prizes are displayed 730 to the player but may be different depending on the player's bet. When the feature completes the machines return to independent play of the Lucky 88 base game.

Accordingly, the feature controller 621 communicates current positions to the gaming machines, typically by broadcasting all positions and related gaming machine IDs so that each gaming machine 10 can display its own position and a common display can also interpret, for example the top 5 players. The common display may be arranged above the bank of gaming machines.

The feature controller 621 also controls each of the game machines to conduct the free games synchronously so that each game machine conducts the same number of play rounds of the feature game. To do so, each participating EGM's client module 630 confirms to the feature controller 621 that is has completed a play round (also referred to herein as a game round). The feature controller 621 determines that all machines have completed the play round and broadcasts that the next play round should begin.

The feature controller 621 is arranged to determine a winning machine. In an embodiment, this is done on a first past the post basis—i.e. the end condition for the feature game is that the pyramid is full (a designated threshold of golden nugget objects having being selected). The first machine to fill all the segments advises the feature controller 621 that is has done so and the feature game controller 950 awards it a win. Awards are also made to the 2nd to 5th machines based on current totals of other machines. Accordingly, it will be appreciated that after each game round it is determined 940 whether an end condition is met. In another embodiment, prizes are awarded to the first five machines to reach the designated number of gold nugget symbols.

If there are ties, these can be arbitrated in accordance with known techniques, including by splitting prizes, awarding the same prize to all machines or by determining based on one or more rules which machine wins. For example, based on which EGM's win message is received first, or based on a countback system where the number of nuggets in the last round are compared to see which machine has the most nuggets and if repeating the comparison (if necessary), until one machine has more nuggets than the others.

Persons skilled in the art will also appreciate that other functionality can be linked to the network. For example, a group display may be added to the network which can display leading participants.

In an alternative embodiment, rather than one of the EGM's 10 acting as the feature controller, a dedicated feature controller can be provided in the network.

In another alternative embodiment, the players may compete towards achieving some other outcome (which provides the end condition). In other embodiments, prizes may be awarded based on both who is first to achieve the outcome and time taken to achieve the outcome. In other embodiments, there may be a fixed number of game rounds and prizes may be awarded based on the positions of the players at the end of the fixed number of spins. In such an embodiment, the outcome may be divided into a number of separate levels and prizes may additionally be warded based on the level the player ahs attained during the number of game rounds. In each case a player progress record is updated 930 for each player after each game round In some embodiments, the players may have to interact before, during or after play of the tournament to make decisions which affect the overall outcome of the tournament, for example, to select the volatility of the tournament game.

Tournament prizes can take a number of forms and may be fixed prizes, game selections, free games, etc.

It will be understood to persons skilled in the art of the invention that many modifications may be made without departing from the spirit and scope of the invention, in particular, that features described herein can be used to form other embodiments.

In an alternative embodiment, where only active gaming machines participate in the feature game, the trigger rate in a single machine is fixed, e.g. 1 in 300 and the chance of the tournament being triggered is hence related to the number of active gaming machines on the bank.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by transmitting it from a server). The program code could be executed by a more than one processing unit. For example, partly by the server module and partly by the client (and accordingly spread between a number of different locations.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of triggering a multi-player game in a gaming system having a) a plurality of gaming machines, each of the gaming machines having a credit input mechanism configured to receive a physical item representing a monetary value to establish a credit balance, the credit balance being increasable and decreasable based at least on wagering activity, a credit meter configured to monitor the credit balance, a memory storing a plurality of symbols, a display having a plurality of display positions, and a payout mechanism, and a game controller, and b) a feature controller, the method comprising:

determining, via the feature controller, in response to the wagering activity, a number of eligible gaming machines;

communicating, via the feature controller, hit rate data based on the number of eligible gaming machines to the eligible gaming machines;

determining, via the game controller of each of the eligible gaming machines, whether the multi-player game is to be triggered based on the communicated hit rate data; and triggering the multi-player game at each of the plurality of gaming machines in accord with the determining by at least one of the eligible gaming machines that the multi-player game is to be triggered.

2. A method as claimed in claim 1, wherein eligible gaming machines are active gaming machines of a set of gaming machines.

3. A method as claimed in claim 1, wherein the current hit rate data includes the number of eligible gaming machines and each gaming machine determines the hit rate from the number.

4. A method as claimed in claim 1, wherein the current hit rate data is the current hit rate.

5. A method as claimed in claim 1, wherein each eligible gaming machine determines whether to trigger the multi-player game as part of each game round.

6. A gaming system for conducting a multi-player game, the gaming system comprising:

a plurality of gaming machines configured to conduct the multi-player game to be played by two or more players, each of the gaming machines having a credit input mechanism configured to receive a physical item representing a monetary value to establish a credit balance, the credit balance being increasable and decreasable based at least on wagering activity, a credit meter configured to monitor the credit balance, a memory storing a plurality of symbols, a display having a plurality of display positions, and a payout mechanism, and a game controller, the game controller configured to determine whether the multi-player game is to be triggered based on hit-rate data; and a feature controller configured to, in response to the wagering activity, determine a number of eligible gaming machines, to communicate the hit rate data to the eligible gaming machines, and to trigger the multi-player game at each of the plurality of gaming machines in accord with at least one of the eligible gaming machines having determined that the multi-player game is to be triggered; and wherein the game controller is configured to determine at the eligible gaming machines whether to trigger the multi-player game at a hit rate based on the hit rate data.

7. A gaming system as claimed in claim 6, comprising a feature controller arranged to determine the number of eligible gaming machines and communicate the hit rate data.

8. A gaming system as claimed in claim 7, wherein the feature controller is provided by one of the gaming machines.

9. A gaming system as claimed in claim 7, wherein the feature controller is separate to the gaming machines.

10. A gaming system as claimed in claim 7, wherein eligible gaming machines are active gaming machines of a set of gaming machines.

11. A gaming system as claimed in claim 7, wherein the current hit rate data includes the number of eligible gaming machines and each gaming machine determines the hit rate from the number.

12. A gaming system as claimed in claim 7, wherein the current hit rate data is the current hit rate.

13. A gaming system as claimed in claim 7, wherein each eligible gaming machine determines whether to trigger the multi-player game as part of each game round.

14. A method of gaming in a gaming system having a) a plurality of gaming machines, each of the gaming machines a credit input mechanism configured to receive a physical item representing a monetary value to establish a credit balance, the credit balance being increasable and decreasable based at least on wagering activity, a credit meter configured to monitor the credit balance, a memory storing a plurality of symbols, a display having a plurality of display positions, and a payout mechanism, and a game controller, and b) a feature controller, the method comprising:

starting, via the feature controller, in response to one of the gaming machines determining that a multi-player game is to be triggered based on hit rate data communicated from the feature controller to the game controller, a multi-player game to be played by two or more players;

selecting, via the game controller, a plurality of symbols for display at a plurality of display positions on a display associated with the player, and updating, via the game controller, a player progress record from the displayed symbols of designated symbols;

determining, via the game controller, at least one winning player when the end condition is met from each player's progress record; and making, via the payout mechanism, an award to each winning player.

15. A method as claimed in claim 14, wherein the end condition is that at least one player achieves an outcome.

16. A method as claimed in claim 15 wherein the outcome is that a designated number of designated symbols is reached by at least one of the players and wherein each player progress record stores a current number of designated symbols and in each game round, the player progress record is updated by determining a number of designated symbols for the round from the displayed symbols.

17. A method as claimed in claim 16 comprising, for each game round, visually representing each player's record by filling individual ones of a plurality of progress display positions corresponding to the designated total with the number of designated symbols determined for the game round.

18. A method as claimed in claim 15, wherein the award is dependent at least partly on the time taken to achieve the outcome.

19. A method as claimed in claim 14, wherein the end condition is that a designated number of game rounds is completed.

20. A method as claimed in claim 19, wherein the award is based at least partly on the player's position based on the player progress record.

* * * * *